United States Patent [19]

Agaisse

[11] 4,266,992

[45] May 12, 1981

[54] METHOD FOR END TO END CONNECTION OF MINERAL-INSULATED ELECTRIC CABLE AND ASSEMBLY FOR SAME

[75] Inventor: Michel Agaisse, St. Gratien, France

[73] Assignee: Les Cables De Lyon, Lyon Cedex, France

[21] Appl. No.: 941,354

[22] Filed: Sep. 11, 1978

[30] Foreign Application Priority Data

Sep. 30, 1977 [FR] France .................. 77 29456

[51] Int. Cl.³ .................. B21F 15/06; H02G 15/18
[52] U.S. Cl. .................. 156/49; 29/761; 156/50; 156/52; 156/56; 156/86; 156/198; 156/294; 174/74 A; 174/84 C; 174/85; 174/88 R; 338/274; 29/871
[58] Field of Search .................. 29/628, 629, 630 F, 29/761; 156/49, 50, 52, 56, 86, 198, 293, 294; 174/74 A, 84 C, 85, 88 R; 338/274

[56] References Cited

U.S. PATENT DOCUMENTS

| | | | |
|---|---|---|---|
| 2,538,225 | 1/1951 | Alford | 156/49 X |
| 3,243,500 | 3/1966 | Rabinowitz | 174/84 R |
| 3,404,216 | 10/1968 | Amann et al. | 174/84 C |
| 3,717,717 | 2/1973 | Cunningham et al. | 156/49 X |
| 4,142,592 | 3/1979 | Brusselmans | 156/49 X |

FOREIGN PATENT DOCUMENTS

| | | |
|---|---|---|
| 424623 | 11/1933 | United Kingdom . |
| 730579 | 5/1955 | United Kingdom . |
| 826897 | 1/1960 | United Kingdom . |
| 979220 | 1/1965 | United Kingdom . |
| 987514 | 3/1965 | United Kingdom . |
| 1006963 | 10/1965 | United Kingdom . |
| 1084059 | 9/1967 | United Kingdom . |
| 1470049 | 4/1977 | United Kingdom . |

*Primary Examiner*—John T. Goolkasian
*Assistant Examiner*—Robert A. Dawson
*Attorney, Agent, or Firm*—Sughrue, Rothwell, Mion, Zinn and Macpeak

[57] ABSTRACT

A method of end-to-end connection single- or multi-conductor electric cables having compressed mineral insulation and apparatus for end-to-end connection. The conductive metal sheath and the mineral insulation which covers the conductor(s) are removed along a short length at each cable end, a metal sleeve is fitted on the ends of the conductors, opposite each other, the sleeve is crimped on the ends of the conductors, a ring made of the same metal is fitted on each cable end, then a cylindrical connection sleeve with thin ends is fitted over the rings, then the ends of the cylindrical connection sleeve are crimped on the rings and on the ends of the cables.

9 Claims, 3 Drawing Figures

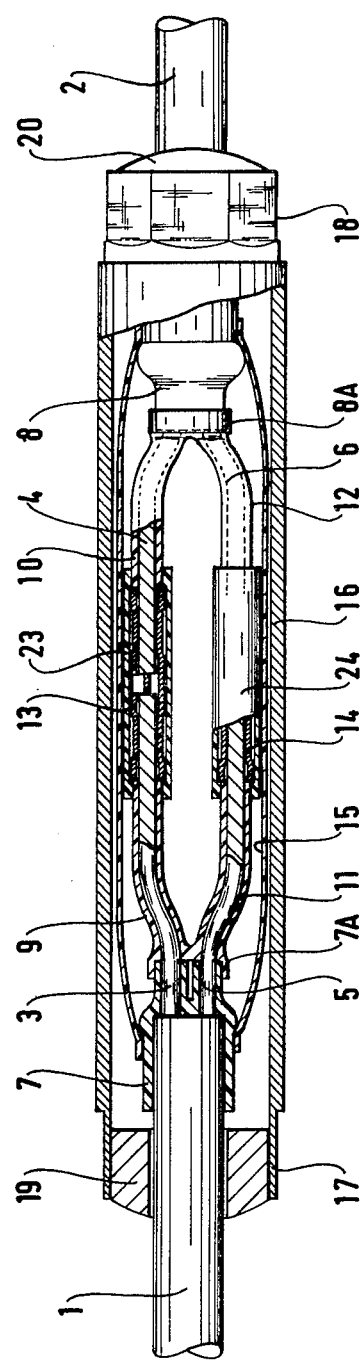
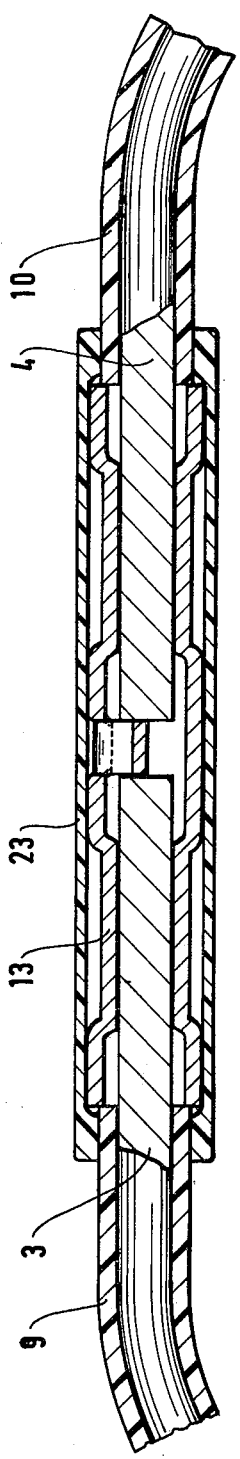

METHOD FOR END TO END CONNECTION OF MINERAL-INSULATED ELECTRIC CABLE AND ASSEMBLY FOR SAME

FIELD OF THE INVENTION

The present invention relates to a method of end-to-end connection of single- or multi-conductor electric cables having compressed mineral insulation. It also relates to apparatus for end-to-end connection of electric cables with mineral insulation by such a method and to a crimping clamp specially adapted to this method.

BACKGROUND OF THE INVENTION

The method of the invention is of a type in which the conductive metal sheath and the mineral insulation sleeve is fitted on the respective ends of each pair of corresponding conductors, said sleeve is crimped onto the ends of the conductors, and then a cylindrical connection sleeve is fitted and crimped onto the ends of the conductive metal sheath.

Difficulties are encountered when connecting electric cables with compressed mineral insulation, in particular when connecting power cables and heating cables such as those commercialized by the Applicant under the trademark "Pyrotenax" and more particularly when connecting multiple conductor cables, since they must be perfectly sealed to prevent any ingress of dampness into the mineral insulation via the cable ends and the mechanical properties of the cables and the electrical conductivity of the conductors must be maintained while the connection device must not be very bulky because the available accomodation space for these cables is often small.

A method of this type has already been described in U.S. Pat. No. 3,243,500. This U.S. patent describes a copper sleeve crimped on the ends of the conductors, a powder-filled casing formed by a tubular sleeve which has an opening for inserting the mineral insulation, and an outside sleeve which can slide along the casing to compress the mineral insulation and which is crimped at its ends on the cable sheaths. Such a method takes a relatively long time and requires the use of powerful crimping clamps to crimp the outside sleeve on the cable sheaths in a fluid-tight manner.

Preferred methods in accordance with the present invention provide rapid and simple end-to-end connection of electric cable having compressed mineral insulation, together with easy and fluid-tight crimping of a sleeve on the ends of the cable sheaths.

SUMMARY OF THE INVENTION

The present invention provides a method of end-to-end connection of single- or multi-conductor electric cables having compressed mineral insulation and a conductive metal sheath, wherein the conductive metal sheath and the mineral insulation which surrounds the conductor(s) are removed at the ends of the cables to be connected, a ring made of the same metal as that of the sheaths is fitted on each of the cable ends, a cylindrical connection sleeve having an appreciably greater inside diameter than the outside diameter of the cable sheaths and having a reduced wall thickness at each of its ends is positioned for fitting on the rings, a metal connection sleeve is fitted on the respective ends of the, or each pair of corresponding conductors and is crimped onto the ends of the said pair(s) of conductors, the said cylindrical connection sleeve is fitted on the said rings, and its ends of reduced wall thickness are crimped onto the rings and the ends of the cable sheaths.

It also has preferably at least one of the following characteristics:

a cap made of flexible heat-resistant material is fitted on the end of each cable and covers in a fluid-tight manner said end of the cable and the ends of the conductors up to the zone which is to be crimped in the metal sheath;

a sheath of flexible heat-resistant material is fitted on the end of one of the two opposite conductors, then when the sleeve has been crimped on the ends of the conductors, the flexible sheath is disposed round the sleeve; and for a multi-conductor electric cable, after the crimped sleeves have been positioned, a common thermo-retractable sheath is fitted round the set of crimped connections of the conductor and round the ends of the cables, and is then retracted by heating.

The present invention also provides apparatus for connecting cables in accordance with the above-defined method including one metal sleeve which can easily be crimped per pair of conductors to be connected together, and a cylindrical connection sleeve which is also made of a metal which can easily be crimped is characterized in that the cylindrical connection sleeve has an inside diameter slightly greater than the outside diameter of the rings and is thinner at each of its ends and that it also includes two metal rings which can easily be crimped, whose inside diameter is slightly greater than the outside diameter of the cable sheaths and whose outside diameter is slightly smaller than the inside diameter of said cylindrical connection sleeve.

It also has preferably at least one of the following characteristics:

it includes a flexible heat-resistant sheath for covering each crimped sleeve;

it includes a cap made of an elastomer which is flexible and heat-resistant, for covering the end of each cable and the ends of its conductors up to their crimped zone; and it includes a thermoretractable sheath for covering the set of crimped connections of the conductors and of the ends of the cables.

The crimping clamp for crimping the opposite ends of four conductors disposed in a square configuration of electric cables with mineral insulation according to the invention comprises a die formed by three parts having polygonal recesses opposite each other, namely two lateral parts each of which has two recesses on its inner side, and a central part which has corresponding recesses on either side.

End-to-end connection of two four-conductor electric cables with compressed mineral insulation and a clamp die for crimping the ends of the conductors to be connected together, are described hereinbelow by way of example with reference to the figures of the accompanying drawings.

BRIEF DESCRIPTION OF THE DRAWINGS

FIG. 1 is a partial axial cross-sectional view of the connection of two electric cables, after the ends of the conductors have been crimped, but before the cylindrical connection sleeve on the left-hand side has been crimped;

FIG. 2 is a view on an enlarged scale of the connection of conductors; and

DESCRIPTION OF THE PREFERRED EMBODIMENT

Figure 3:
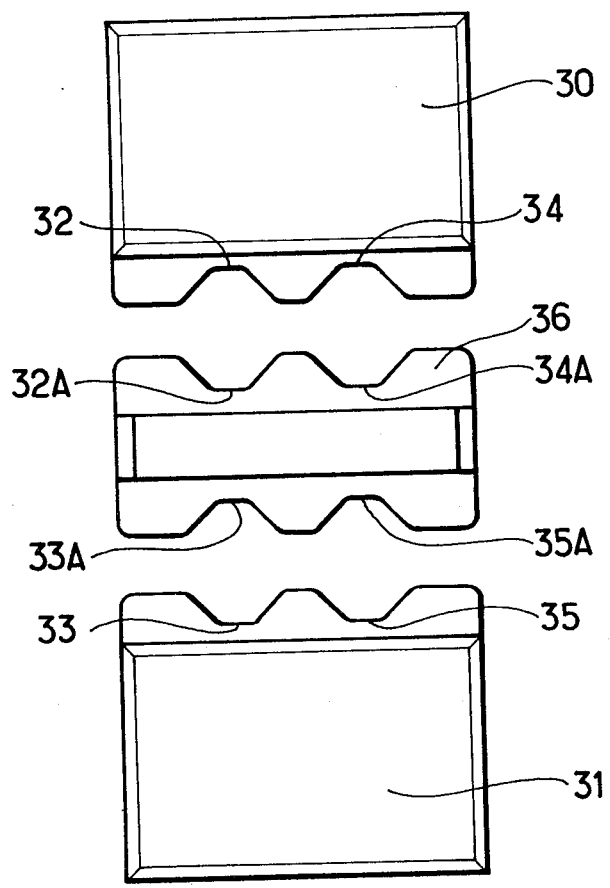
FIG. 3 is a plan view of the jaw of a crimping clamp for a four-conductor cable.

With reference to FIGS. 1 and 2, the cables to be connected together are designated by reference numerals 1 and 2. Since the conductors in the cable are disposed in a square configuration, only two conductors of each cable (3 and 5 of the cable 1 and 4 and 6 of the cable 2) can be seen. The other two conductors of each cable are hidden. Each cable end is covered by a heat-resistant elastomer cap; 7 for the cable 1; and 8 for the cable 2. These caps have fixed on them hollow end fittings 7A and 8A which are extended by end pieces, such as 9 and 11 for the conductors 3 and 5 and 10 and 12 for the conductors 4 and 6, also made of a heat-resistant elastomer, and surrounding the ends of the conductors up to the crimping zone. The ends of the conductors are connected together by copper sleeves such as 13 and 14 which have been hexagonally crimped by means of a double-die clamp such as the one described hereinafter. These sleeves are covered by silicone sheaths 23 and 24. Sealing is completed by a common sheath 15 made of thermoretractable or thermo-shrinkable silicone which covers the sleeves, the ends of the conductors and the caps. The cables themselves are connected by rings 19 and 20 and by a connection sleeve 16 whose ends 17 and 18 are thinner than the rest of the sleeve 16. The inside diameter of the rings 19 and 20 is slightly greater than the outside diameter of the cables but smaller than the inside diameter of the caps. The end surfaces of the rings facing the connection are plane, their other end surfaces being spherical. The inside diameter of the sleeve is slightly greater than that of the rings. The sleeve is hexagonally crimped on the rings and the rings are crimped on the cables behind the caps by means of a clamp of known type, for example the clamp sold under the trade name "Simeca". The empty space behind the plane surfaces of the rings facilitates the crimping thereof. It is seen that after this crimping, the ends of the conductors and the mineral insulant of the cables are perfectly isolated from the ambient atmosphere.

In FIG. 3, the die for the four-conductor crimping clamp consists of three parts: two lateral parts 30 and 31 and one central part 32. The lateral parts have hollows or recesses 32 and 34, 33 and 35 on the inner side and the central part has hollows or recesses 32A and 34A, 33A and 35A on either side which form hexagonal openings with the hollows opposite them.

It will be understood that if it is required to crimp the conductors with a two-conductor cable, it is necessary to use only the lateral parts 30 and 31. If it is required to crimp a three-conductor cable, the three parts are used and one of the openings is closed.

Although the assembly method and device as well as the crimping clamp die which have just been described with reference to the figures appear preferable, it will be understood that various modifications may be made thereto without going beyond the scope of the invention. In particular, the cap which covers the end of the cable and the end pieces which cover the ends of the conductors can be connected together in a single part. The crimping configuration can be of a different geometrical shape.

I claim:

1. A method of end-to-end connection of single- or multi-conductor electric cables having at least one electrical conductor, a conductive metal sheath and compressed mineral insulation within said conductive metal sheath and between said sheath and said at least one conductor, said method comprising the steps of:
    removing the conductive metal sheath and the mineral insulation which surrounds the conductor at the ends of the cables to be connected,
    fitting a metal conductor connection sleeve onto opposed ends of each pair of corresponding conductors of respective cable ends,
    crimping said metal conductor connection sleeve onto the ends of said pair of conductors,
    fitting a ring made of the same metal as that of the sheaths on each of the cable ends;
    fitting a cap made of a flexible heat-resistant material onto the end of each cable and internally of said ring, and
    positioning a cylindrical metal connection sleeve having an appreciably greater inside diameter than the outside diameter of the cable sheaths and having a reduced wall thickness at each of its ends onto said rings for fitting and crimping said cylindrical connection sleeve onto said rings at its ends of reduced wall thickness such that the reduced wall thickness ends are crimped onto said rings and the ends of the cable sheaths.

2. A method according to claim 1, further comprising covering in a fluid-tight manner the zone where each metal conductor connection sleeve is crimped to the ends of the conductors and completely from one cap to the other, subsequently to the crimping of each metal conductor connection sleeve to the ends of the conductor pairs and prior to positioning of said cylindrical metal connection sleeve onto said ring.

3. A method according to claim 1, further comprising the step of fitting a sheath of flexible heat-resistant material to each metal conductor connection sleeve connecting the ends of conductors of respective cable ends prior to positioning said cylindrical metal connection sleeve onto said rings and crimping said metal connection sleeve at its ends of reduced wall thickness onto said rings.

4. A method according to claim 1, wherein said electric cable comprises a multi-conductor cable, and said method further comprising the step of fitting, after the metal conductor connection sleeves have been crimped onto the ends of the conductors, a common thermo-shrinkable sheath around the multiple set of conductors and around the ends of the cables internally of the rings, and then shrinking by heating said thermo-shrinkable sheath about all of said conductor connections by way of each metal conductor connection sleeve, prior to positioning of said cylindrical metal connection sleeve onto said rings and crimping said metal connection sleeve thereto.

5. An assembly for end-to-end connection of single or multiple conductor electric cables having at least one electrical conductor, a conductive metal sheath, and compressed mineral insulation within said conductive metal sheath and between said conductive metal sheath and said at least one conductor, by a method comprising the steps of:
    removing said conductive metal sheath and said mineral insulation which surrounds the conductor(s) at the ends of the cables to be connected;

fitting a metal conductor connection sleeve onto the respective ends of each pair of corresponding conductors;

crimping said metal conductor connection sleeve onto the ends of said pair of conductors;

fitting a ring made of the same metal as that of the conductive metal sheath for each cable on each of the cable ends;

positioning a cylindrical metal cable connection sleeve having an appreciably greater inside diameter than the outside diameter of the cable sheaths and having a reduced wall thickness at each of its ends, onto the rings;

crimping said cylindrical metal cable connection sleeve onto said rings and said rings to said metal cable sheath, said assembly comprising:

one metal conductor sleeve which can easily be crimped per pair of conductors to be connected together, and a slim cylindrical metal cable connection sleeve which is also made of a metal which can be easily crimped, said cylindrical cable connection sleeve having an inside diameter appreciably greater than the outside diameter of the cable sheaths and having a reduced wall thickness at each of its ends; and two metal rings which can be easily crimped, said rings having an inside diameter which is slightly greater than the outside diameter of the cable sheaths and an outside diameter which is slightly smaller than the inside diameter of said cylindrical cable connection sleeve; and further including a cap made of an elastomer, for covering the end of each cable and the ends of its conductors up to their crimped zone.

6. Assembly according to claim 5, further including a flexible heat-resistant sheath for covering each crimped metal conductor sleeve in a fluid-tight manner.

7. Assembly according to claim 5, further including a thermo-shrinkable sheath for covering the set of crimped connections of the conductors and of the ends of the cables.

8. A crimping clamp for crimping the opposite ends of four conductors disposed in a square configuration of electric cables having a conductive metal sheath and compressed mineral insulation within said conductive metal sheath and between said sheath and said four conductors according to a method comprising the steps of:

removing the conductive metal sheath and the mineral insulation which surrounds the conductor(s) at the ends of the cables to be connected;

fitting a metal conductor connection sleeve onto the respective ends of each pair of corresponding conductors;

crimping said metal conductor connection sleeve onto the ends of each pair of conductors;

fitting a ring made of the same metal as that of the conductive metal sheaths onto each of the cable ends;

positioning a cylindrical metal cable connection sleeve having an appreciably greater inside diameter than the outside diameter of the cable sheaths and having a reduced wall thickness at each of its ends onto said rings and fitting said reduced wall thickness ends to said rings at respective ends of said cylindrical metal connection sleeve; and crimping said cylindrical metal cable connection sleeve at its ends of reduced wall thickness to said rings and the ends of the metal cable sheaths, said clamp comprising:

a die formed by three parts, said three parts comprising two lateral parts on respective sides of a central part, each of said lateral parts having two recesses on its face facing said central part, and said central part having correspondingly paired recesses on both sides and facing the recesses of said lateral parts.

9. A method of end-to-end connection of sheathed metal electric cables having at least one electrical conductor, a conductive metal sheath and compressed mineral insulation within said conductive metal sheath between said sheath and said at least one conductor, said method comprising the steps of:

fitting a metal conductor connection sleeve onto respective ends of each pair of corresponding conductors to join the conductors of respective cable ends, crimping said metal conductor connection sleeve onto the ends of said pair of conductors, fitting a sheath of flexible heat-resistant material onto said conductors and overlying said metal conductor connection sleeve after said metal conductor connection sleeve has been crimped onto the ends of said conductors, fitting a cap made of a flexible heat-resistant material onto the ends of each cable internally of said ring, fitting between said caps of flexible heat-resistant material and overlying each sheath of flexible heat-resistant material on said metal conductor connection sleeve, a common thermal-shrinkable sheath surrounding said set of conductors, the ends of said cable and said caps, shrinking by heating said thermal-shrinkable sheath, fitting a ring made of the same metal as that of said sheath on each of the cable ends, positioning a cylindrical metal connection sleeve having an appreciably greater inside diameter than the outside diameter of the cable sheath and having a reduced wall thickness at each of its ends onto said rings, crimping said cylindrical connection sleeve onto said rings at its ends of reduced wall thickness and said rings to the ends of said cable sheaths to thereby facilitate a highly effective waterproof end-to-end connection between said sheathed electric cables.

* * * * *